United States Patent [19]

Utecht et al.

[11] Patent Number: 6,133,392
[45] Date of Patent: Oct. 17, 2000

[54] INSOLUBLE POLYMERS WHICH CAN SWELL ONLY SLIGHTLY WITH MODIFIED AMINO GROUPS, PROCESSES FOR THEIR PREPARATION, AND THEIR USE

[75] Inventors: Jens Utecht, Neulussheim; Martin Rübenacker, Altrip; Claudia Nilz, Rödersheim-Gronau; Rainer Rahm, Ludwigshafen, all of Germany

[73] Assignee: BASF Aktiengesellschaft, Ludwigshafen, Germany

[21] Appl. No.: 09/147,804

[22] PCT Filed: Aug. 21, 1997

[86] PCT No.: PCT/EP97/04545

§ 371 Date: Mar. 11, 1999

§ 102(e) Date: Mar. 11, 1999

[87] PCT Pub. No.: WO98/11145

PCT Pub. Date: Mar. 19, 1998

[30] Foreign Application Priority Data

Sep. 11, 1996 [DE] Germany ............. 196 36 883

[51] Int. Cl.$^7$ ............. C08F 12/28
[52] U.S. Cl. ............. 526/312; 526/310; 526/318.2; 526/318.3
[58] Field of Search ............. 526/310, 312, 526/318.2, 318.3

[56] References Cited

U.S. PATENT DOCUMENTS

| | | |
|---|---|---|
| 3,424,790 | 1/1969 | Bond et al. . |
| 4,421,602 | 12/1983 | Brunnmueller et al. . |
| 4,978,427 | 12/1990 | Pfohl et al. . |
| 5,430,110 | 7/1995 | Ahlers et al. . |
| 5,599,898 | 2/1997 | Hartmann et al. . |

FOREIGN PATENT DOCUMENTS

| | | |
|---|---|---|
| 0 071 050 | 2/1983 | European Pat. Off. . |
| 0 143 328 | 6/1985 | European Pat. Off. . |
| 0 216 387 | 4/1987 | European Pat. Off. . |
| 0 251 182 | 1/1988 | European Pat. Off. . |
| 0 262 577 | 4/1988 | European Pat. Off. . |
| 0 264 649 | 4/1988 | European Pat. Off. . |
| 0 545 383 | 6/1993 | European Pat. Off. . |
| 0 580 078 | 1/1994 | European Pat. Off. . |
| 2 303 081 | 7/1974 | Germany . |
| 44 13 720 | 10/1995 | Germany . |
| WO 94/11408 | 5/1994 | WIPO . |
| WO 95/29221 | 11/1995 | WIPO . |

OTHER PUBLICATIONS

Chemical Abstracts, vol. 1109, No. 16, Oct., 1998, AN 129904w, JP 63 066 205, Mar. 24, 1988.

Patent Abstracts of Japan, vol. 095, No. 006, Jul. 31, 1995, JP 07082320, Mar. 28, 1995.

Patent Abstracts of Japan, vol. 013, No. 515 (C–655), Nov. 17, 1989, JP 01 207311, Aug. 21, 1989.

*Primary Examiner*—Helen L. Pezzuto
*Attorney, Agent, or Firm*—Oblon, Spivak, McClelland, Maier & Neustadt, P.C.

[57] ABSTRACT

An insoluble, only slight swellable, polymer having modified amino groups, which contain units of the formulae:

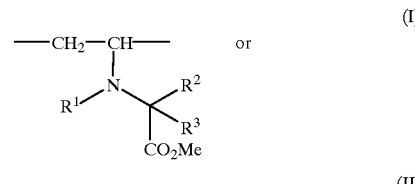

(I)

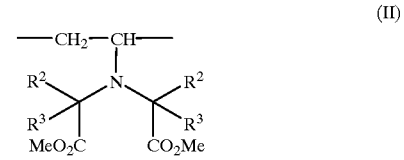

(II)

or both (I) and (II),
wherein $R^1$, $R^2$, $R^3$ and Me are as defined herein.

7 Claims, No Drawings

INSOLUBLE POLYMERS WHICH CAN SWELL ONLY SLIGHTLY WITH MODIFIED AMINO GROUPS, PROCESSES FOR THEIR PREPARATION, AND THEIR USE

BACKGROUND OF THE INVENTION

1. Field of the Invention

The present invention relates to insoluble, only slightly swellable polymers having modified amino groups, processes for the preparation of such polymers and the use of the insoluble, only slightly swellable polymers having modified amino groups as adsorber resin for metal ions and ion exchangers.

2. Description of the Background

DE-A-23 03 081 discloses the preparation of water-soluble reaction products of polyethyleneimine with the sodium salt of chloroacetic acid in aqueous solution. Water-soluble polyethyleneimines having iminodiacetic acid groups are obtained. The water-soluble polymers are used as complexing agents for metal ions.

U.S. Pat. No. 3,424,790 discloses the preparation of water-soluble, carboxymethylated polyethyleneimines by a multistage process. First, equivalent amounts of polyethyleneimine are reacted with formaldehyde at from −15 to 40° C. Thereafter, the adduct is reacted with hydrogen cyanide or alkali metal cyanides, likewise at from −15 to 40° C., and the reaction products are hydrolyzed with alkali metal hydroxides at from 50 to 110° C. in a subsequent reaction stage. EP-B-071 050 discloses partially hydrolyzed polymers of N-vinylformamide which contains from 90 to 10 mol % of vinylamine units and from 10 to 90 mol % of N-vinylformamide units. EP-A-0 216 387 describes copolymers of N-vinylformamide with other ethylenically unsaturated monomers. The polymerized N-vinylformamide units can be converted into vinylamine units by hydrolysis with acids or bases. Polymers containing vinylamine units are furthermore described in EP-A-0 262 577, EP-A-264 649 and EP-A-0 251 182.

WO-A-94/11408 discloses insoluble, only slightly swellable polymers which contain polymerized vinylamine units. These polymers are prepared by polymerizing N-vinylcarboxamides and, if required, other monoethylenically unsaturated monomers copolymerizable with said N-vinylcarboxamides with, as crosslinking agents, compounds containing at least two ethylenically unsaturated double bonds, in the absence of oxygen and polymerization initiators, to give popcorn polymers, and then hydrolyzing the polymerized N-vinylcarboxamide units to give vinylamine units by the action of acids, bases or enzymes. The amino-containing popcorn polymers are used as ion exchangers or as adsorber resin for metal ions. The polymers described above and containing N-vinylglycine or N-vinyliminodiacetic acid units are water-soluble. If they are used as complexing agents for metal ions dissolved in water, expensive technology is required for separating the polymeric complexes from the solution.

SUMMARY OF THE INVENTION

It is an object of the present invention to provide novel substances.

DETAILED DESCRIPTION OF THE PREFERRED EMBODIMENTS

We have found that this object is achieved, according to the invention, by insoluble, only slightly swellable polymers which have modified amino groups and contain units of the formulae

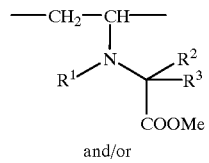

and/or

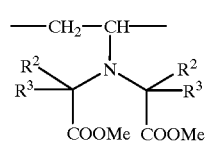

where
$R^1$ is H, $C_1$–$C_6$-alkyl
$R^2, R^3$ are each H, $C_1$–$C_{20}$-alkyl, aryl, aralkyl
Me is H, or one equivalent of an alkali metal, of an alkaline earth metal or of ammonium.

The present invention furthermore relates to a process for the preparation of insoluble, only slightly swellable polymers having modified amino groups. In the process, an insoluble, only slightly swellable polymer which contains units of the formula

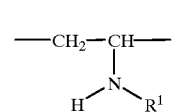

where $R^1$ is H or $C_1$–$C_6$-alkyl, is reacted with
(1) α-halocarboxylic acids or alkali metal, alkaline earth metal or ammonium salts thereof
or
(2) aldehydes and hydrogen cyanide or an alkali metal cyanide or
    cyanohydrins obtained from aldehydes and alkali metal cyanide, and carrying out hydrolysis of the adducts.

The present invention furthermore relates to the use of the insoluble, only slightly swellable polymers having modified amino groups as adsorber resins for metal ions and as ion exchangers.

The novel polymers are obtained by a multistage process. First, popcorn polymers which are insoluble in all solvents and only slightly swellable therein are prepared by known methods. For this purpose, monomers which belong to the abovementioned groups (a), (b) and (c) are polymerized.

Monomers of group (a) which are used for the preparation of the known popcorn polymers are N-vinylcarboxamides of the formula

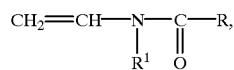

where R and $R^1$ are each H or $C_1$–$C_6$-alkyl.

Suitable compounds of the formula IV are, for example, N-vinyl-formamide, N-vinyl-N-methylformamide, N-vinylacetamide, N-vinyl-N-methylacetamide, N-vinyl-N-ethylformamide, N-vinyl-N-n-propyl-formamide, N-vinyl-N-isopropylformamide, N-vinyl-N-isobutylformamide, N-vinyl-N-methylpropionamide, N-vinyl-n-butylacetamide and N-vinyl-N-methylpropionamide. From this group of monomers, N-vinylformamide is preferably used.

Monomers of group (b), which may be present in the preparation of popcorn polymers are other monoethylenically unsaturated monomers copolymerizable with the monomers of groups (a) and (c). These include, for example, acrylamide, methacrylamide, acrylic acid, methacrylic acid, acrylates, methacrylates and/or vinyl esters. The acrylates and methacrylates are preferably derived from saturated, monohydric alcohols of 1 to 4 carbon atoms or saturated dihydric alcohols of 2 to 4 carbon atoms. Examples of these esters are methyl acrylate, methyl methacrylate, ethyl acrylate, ethyl methacrylate, n-propyl acrylate, n-propyl methacrylate, isopropyl acrylate, isopropyl methacrylate and the esters of acrylic acid and methacrylic acid which are derived from the isomeric butanols, as well as hydroxyethyl acrylate, hydroxyethyl methacrylate, hydroxypropyl acrylate, hydroxypropyl methacrylate, hydroxybutyl acrylate, hydroxyisobutyl acrylate and hydroxyisobutyl methacrylate. Preferred vinyl esters are vinyl formate, vinyl acetate and vinyl propionate. Other suitable monomers of group (b) are acrylonitrile, methacrylonitrile, N-vinylpyrrolidone, N-vinylcaprolactam, 1-vinylimidazole, 2-methyl-1-vinylimidazole and 4-methyl-1-vinylimidazole. The monomers of group (b), alone or as a mixture with one another, can be polymerized together with the monomers of groups (a) and (c). Among the monomers of group (b), N-vinylpyrrolidone is particularly suitable for the preparation of popcorn polymers.

Where they are used in the preparation of the popcorn polymers, the monomers of group (b) are present in an amount of from 0.1 to 80% by weight in the monomer mixture comprising (a) and (b).

Compounds which act as crosslinking agents and contain at least two ethylenically unsaturated nonconjugated double bonds in the molecule are used as monomers of group (c) in the polymerization. For example, alkylenebisacrylamides, such as methylenebisacrylamide, and N,N'-acryloylethylenediamine, N,N'-divinylethyleneurea, N,N'-divinylpropyleneurea, ethylidene-bis-3-(N-vinylpyrrolidone), N,N'-divinyl-2,2'-diimidazolylbutane and 1,1'-bis(3,3'-vinyl-benzimidazolin-2-one)-1,4-butane are particularly suitable. Other suitable crosslinking agents are, for example, alkylene glycol di(meth)acrylates, such as ethylene glycol diacrylate, ethylene glycol dimethacrylate, tetraethylene glycol acrylate, tetraethylene glycol dimethacrylate, diethylene glycol diacrylate, and diethylene glycol dimethacrylate, aromatic divinyl compounds, such as divinylbenzene and divinyltoluene, and vinyl acrylate, allyl acrylate, allyl methacrylate, divinyldioxane, penta-erythrityl triallyl ether and mixtures of the crosslinking agents. The crosslinking agents are used in amounts of from 0.1 to 10, preferably 1 to 4, % by weight, based on the monomers (a) and (b) used in the polymerization.

The popcorn polymerization is carried out by known processes, for example as precipitation polymerization or by mass polymerization. A procedure in which, as described in EP-B-0 177 812, the popcorn polymerization is initiated by heating a mixture of from 99.6 to 98.8% by weight of N-vinylpyrrolidone and 0.4 to 1.2% by weight of a compound having at least two ethylenically unsaturated double bonds, as crosslinking agent, to 100 to 150° C. in the absence of oxygen and polymerization initiators is preferred. This polymerization is initiated in particular by the presence of small amounts of sodium hydroxide solution or potassium hydroxide solution. A polymerizable popcorn polymer forms within a short time and, with addition of other suitable monomer mixtures, i.e. the monomers of group (a) and, if required, (b) and further addition of monomers (c), initiates the popcorn polymerization of these monomers without an induction period.

In order to carry out the popcorn polymerization without solvents, the monomer mixture of (a) and (c) and, if required, (b) is rendered inert by passing in nitrogen and is then heated to 100–200° C., preferably 150–180° C. It is advantageous to continue passing a gentle stream of nitrogen through the monomers even during the polymerization. Exclusion of oxygen is also achieved by polymerizing the batch at a pressure which is below atmospheric pressure and at which the monomers boil. The pulverulent popcorn polymers have an average particle size of from about 10 μm to 5 mm, preferably from 10 μm to 500 μm.

Precipitation polymerization in water at monomer concentrations of from 5 to 30% by weight, at from 20 to 200° C. and a pH above 6 is preferred for the preparation of the popcorn polymers. Further information on the preparation of the popcorn polymers and hydrolysis of the polymerized N-vinylcarboxamide units is given in WO-A-94/11408. The popcorn polymers contain, for example, from 20 to 100% by weight of N-vinylcarboxamides of the formula IV as polymerized units.

In the hydrolysis, at least 0.5% of the polymerized N-vinylcarboxamides of the formula IV are hydrolyzed with formation of amino groups. The hydrolysis is continued until at least the 0.1%, preferably at least 20%, of the N-vinylcarboxamide units present in the popcorn polymers have been hydrolyzed. The examples of suitable hydrolysis agents are acids, bases and enzymes.

Suitable acids are, for example, mineral acids, such as hydrogen halide (gaseous or aqueous solution), sulfuric acid, nitric acid or phosphoric acid (ortho-, meta- or polyphosphoric acid) or organic acids, for example $C_1$–$C_5$-carboxylic acids, such as formic acid, acetic acid or propionic acid, or aliphatic and aromatic sulfonic acids, such as methanesulfonic acid, benzenesulfonic acid or toluenesulfonic acid. In the hydrolysis with acids, the pH is 0 to 5. From 0.05 to 1.5, preferably from 0.4 to 1.2, equivalents of acid are required per carboxyl radical to be eliminated in the polymer.

After acidic hydrolysis, the popcorn polymers containing amino functions are present as a rule as salts, suitable opposite ions being the corresponding acid anions or anions of the liberated carboxylic acids, for example formate. For the preparation of the novel water-insoluble polymers, it is advantageous partially or completely to deprotonate the polymers in aqueous suspension by adding bases. Particularly suitable bases are alkali metal and alkaline earth metal hydroxides, in particular sodium hydroxide, alkali metal and alkaline earth metal carbonates, in particular sodium carbonate, ammonia and alkyl derivatives of ammonia. The salts formed in the neutralization, e.g. sodium sulfate, remain in aqueous solution.

In the hydrolysis with bases, hydroxides of metals of the first and second main groups of the Periodic Table may be used, for example lithium hydroxide, sodium hydroxide, potassium hydroxide, calcium hydroxide, strontium hydroxide and barium hydroxide. However, ammonia or alkyl or aryl derivatives of ammonia, for example alkylamines or arylamines, such as triethylamine, mono-ethanolamine, diethanolamine, triethanolamine, morpholine, piperidine, pyrrolidine or aniline, are also suitable. In the hydrolysis with bases, the pH of the reaction mixture is, for example, from 8 to 14. The bases can be used in the solid, liquid, or, if required, also gaseous state, diluted or undiluted. Ammonia, sodium hydroxide solution or potassium hydroxide solution is preferably used. The hydrolysis in the acidic or alkaline pH range is carried out at from 20 to 170° C., preferably from 50 to 120° C. It is complete after from about 2 to 8, preferably from 3 to 5 hours. A procedure in which the acids or bases are added in aqueous solution has proven particularly useful. After the hydrolysis, neutralization is generally carried out, so that the pH of the hydrolyzed polymer solution is from 2 to 8, preferably from 3 to 7. The neutralization is required when it is intended to prevent or delay the continuation of the hydrolysis of partially hydrolyzed polymers. For the further processing, the hydrolysis with the aid of bases has the advantage that an additional neutralization step is superfluous.

The hydrolysis may also be carried out with the aid of enzymes, for example proteases, ureases or amidases.

The water-insoluble popcorn polymers which contain vinylamine units and are only slightly swellable may be isolated from the aqueous suspension. However, it is also possible to carry out the subsequent reaction with α-halocarboxylic acids or hydrogen cyanide or alkali metal cyanides and aldehydes immediately after the hydrolysis.

The novel reaction of the insoluble polymer containing vinylamine units with α-halocarboxylic acids takes place unexpectedly smoothly and quantitatively. Owing to its insolubility in solvents, a chemically and physically crosslinked polymer should furthermore be attacked by reagents only with very great difficulty, if at all. However, depending on the reaction conditions, i.e. the amount of α-halocarboxylic acid used or the salts thereof and the reaction medium, reaction time and the reaction temperature, popcorn polymers having modified amino groups of the formulae I and II,

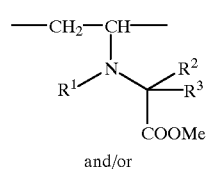

and/or

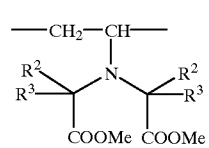

where $R^1$ is H or $C_1$–$C_6$-alkyl, $R^2$ and $R^3$ are each H, $C_1$–$C_{20}$-alkyl, aryl, or aralkyl and Me is H or one equivalent of an alkali metal, of an alkaline earth metal or of ammonium, are in fact obtained. Both structure I and structure II may be formed from primary vinylamine units ($R^1$=H). In the case of secondary vinylamine units ($R^1$≠H) only structure I is possible. Popcorn polymers having primary vinylamine units ($R^1$=H) are preferably used as starting materials.

Suitable α-halocarboxylic acids are all compounds of the formula

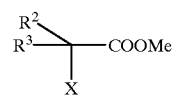

where $R^2$, $R^3$ are each H, $C_1$–$C_{20}$-alkyl, aryl or aralkyl and Me is H, or one equivalent of an alkali metal, of an alkaline earth metal or of ammonium and X is halogen, such as F, Cl, Br or I. Suitable α-halocarboxylic acids of the formula V are, for example, chloroacetic acid, bromoacetic acid, iodoacetic acid, α-chloropropionic acid, α-bromopropionic acid, α-iodopropionic acid, α-chlorobutyric acid, α-bromobutyric acid, α-chlorisobutyric acid, α-bromocaproic acid, 2-chlorovaleric acid, 2-bromophenyl acetic acid, 2-chloro-3-phenylpropionic acid, 2-bromo-3-phenylpropionic acid, α-chlorolauric acid and α-bromopalmitic acid. Chloroacetic acid is preferably used.

The α-halocarboxylic acids may be used as such or in the form of their salts. Suitable opposite ions are monovalent or polyvalent metal ions, for example alkali metal or alkaline earth metal ions. Ammonium ions or alkyl derivatives thereof, for example methyl-, dimethyl-, trimethyl- or tetramethylammonium ions or other alkylammonium ions, are also suitable. Sodium salts are preferably used as starting materials.

Usually, from 0.05 to 5.0, preferably from 0.1 to 2.2, equivalents of α-halocarboxylic acid or alkali metal or alkaline earth metal salt thereof are required per amine unit in the popcorn polymer.

The reaction is carried out in suspension, preferably in a medium in which the α-halocarboxylic acid or its salt is soluble. Inert solvents, e.g. water, methanol, ethanol, isopropanol, ethylene glycol, diethylene glycol, acetonitrile, acetone, tetrahydrofuran, dioxane, N-methylpyrrolidone, diethylether, cyclohexane, pentane, benzene or toluene, and mixtures of the stated solvents are most suitable. The reaction is preferably carried out in water, methanol, ethanol or a mixture of these solvents. The polymer content of the suspension is, for example, from 0.1 to 50, preferably from 1 to 20, % by weight, so that thorough mixing is ensured during the reaction in order to avoid agglomeration. A procedure in which the α-halocarboxylic acid or one of its salts is added in solution has proven particularly useful. When the reaction is carried out in an aqueous medium, a pH of from 7 to 12, preferably from 8 to 10 is established.

The reaction is carried out at from 20 to 180° C., preferably from 50 to 150° C., very particularly preferably from 60 to 110° C. At temperatures above the boiling point of the reaction medium, the reaction is carried out under pressure in an appropriate pressure-resistant container. The reaction time is, for example, from 1 to 30, preferably from 6 to 20 hours. The conversion can be determined, for example, by quantitative analysis of the halide liberated during the reaction.

A further possibility for modifying the amino groups in the popcorn polymers so that insoluble, only slightly swellable polymers having units of the formulae I and/or II are obtained comprises reacting popcorn polymers containing polymerized vinylamine units with aldehydes and hydrogen cyanide or alkali metal cyanides or cyanohydrins obtained from aldehydes and alkali metal cyanide, and carrying out subsequent hydrolysis of the adducts in each case.

Suitable aldehydes are, for example, formaldehyde, acetaldehyde, propionaldehyde, n-butyraldehyde, pentanal, hexanal, heptanal, octanal, decanal, benzaldehyde and oxo aldehydes, such as $C_{13}/C_{15}$ oxo aldehydes or $C_9/C_{11}$ oxo aldehydes. Mixtures of a plurality of aldehydes may also be used. Formaldehyde is preferably used, usually in the form of a concentrated aqueous solution. Readily volatile aldehydes such as formaldehyde and acetaldehyde, can however also be passed in gaseous form into the reaction mixture.

Examples of suitable alkali metal cyanides are sodium cyanide and calcium cyanide, sodium cyanide being preferably used. Ammonium cyanide may also be used.

The reaction is carried out in a medium in which the aldehyde and cyanide dissolve to a sufficient extent, e.g. water, methanol, ethanol, isopropanol, n-propanol, n-butanol, ethylene glycol, diethylene glycol, acetonitrile, acetone, tetrahydrofuran, dioxane or N-methylpyrrolidone, or mixtures of the stated solvents. The reaction is preferably carried out in water. The reaction with hydrogen cyanide is carried out, for example, at a pH of from 0 to 10, preferably from 2 to 6. If, on the other hand, alkali metal cyanide is used, a pH of, for example, from 8 to 14, preferably from 10 to 12, is advisable. The polymer content of the suspension is, for example, from 0.1 to 50, preferably from 1 to 20, % by weight, so that thorough mixing is ensured during the reaction to prevent agglomeration.

The aldehyde and hydrogen cyanide or alkali metal cyanide are preferably used in equimolar amounts, so that 0.1 to 100% of the amino functions present in the polymer are carboxymethylated. Usually, from 0.15 to 3.0, preferably from 0.2 to 2, equivalents of aldehydes and alkali metal cyanides are required per $NH_2$ group. Excess amounts of aldehyde or alkali metal cyanide present no problems because they can be readily separated off from the reaction product. Popcorn polymers having units of the formula I or II and popcorn polymers which contain units of the formula I and II are obtained from popcorn polymers having primary vinylamine units ($R^1$=H), whereas only the units of the formula I are formed in the case of popcorn polymers having secondary vinylamine units. Popcorn polymers which are obtainable by polymerizing N-vinylformamide and have primary amino groups are preferably used as starting materials.

Reaction may be carried out either continuously or batchwise. As a rule, aldehydes and hydrogen cyanide or alkali metal cyanide in aqueous solutions are added to the polymer suspension at from -15 to 100° C., preferably from 0 to 70° C., and said suspension is then stirred for some time at from 20 to 180° C., preferably from 50 to 150° C., and very particularly preferably from 60 to 110° C., to complete the reaction. The reagents may be metered in either all at once or separately from one another over a period of, for example, 0.5 to 10 hours. The procedure in which the aldehyde and hydrogen cyanide or alkali metal cyanide are metered in simultaneously in solution is particularly advantageous, the concentration of cyanide in the reaction mixture being brought to 1 to 50% above the concentration of aldehyde during the addition. This means in practice that hydrogen cyanide or alkali metal cyanide is metered into the polymer at a slightly higher rate than the aldehyde or, alternatively, cyanide is metered in at the same rate but before the aldehyde. This suppresses the formation of by-products.

The reaction can be carried out at atmospheric, superatmospheric or reduced pressure. The reaction with alkali metal cyanides in the alkali pH range is preferably carried out under reduced pressure in order to remove from the reaction mixture the ammonia formed during the hydrolysis. In another preferred embodiment of the process, an inert gas stream, e.g. air or nitrogen, is passed through the reaction mixture during the reaction. A particularly preferred procedure is one which entails simultaneous stripping with an inert gas and the use of reduced pressure, for example from 100 to 900, preferably from 500 to 800, mbar. If hydrogen cyanide is used, the initially obtained cyanoalkylated product is subsequently hydrolyzed in a second step with the aid of bases, preferably sodium hydroxide solution. The intermediate may be either isolated or further processed in the same reaction medium. The hydrolysis is preferably carried out under reduced pressure whilst stripping with an inert gas. By repeating the carboxyalkylation reaction, it is possible to increase the degree of carboxyalkylation of the amino-containing popcorn polymers.

At the end of the reaction, the novel popcorn polymers can be isolated, for example, by filtration or centrifuging with subsequent washing out of the salts present with the corresponding suspending agent, preferably with water or alcohol, and drying in a conventional dryer, such as a through-circulation dryer or vacuum drying oven, a paddle dryer or a pneumatic dryer. The polymers are insoluble in water and all known solvents and furthermore swell only slightly therein.

The insoluble, carboxyl-carrying popcorn polymers are suitable for removing metal ions from solutions. The type of solvent is not important. However, the process is preferably applied to aqueous solutions of metal ions, for example $Mg^{2+}$, $Ca^{2+}$, $Sr^{2+}$, $Ba^{2+}$, $Al^{3+}$, $Ga^{3+}$, $Rb^+$, $Cs^+$, $Cu^{2+}$, $Ag^+$, $Au^{3+}$, $Fe^{2+}$, $Fe^{3+}$, $Ni^{2+}$, $Pd^{2+}$, $Pt^{2+}$, $Co^{2+}$, $Rh^{2+}$, $Ir^{2+}$, $Cr^{3+}$, $Mn^{2+}$, $Mn^{3+}$, $Zn^{2+}$, $Cd^{2+}$, $Hg^{2+}$, $Sn^{2+}$ and $Pb^{2+}$. The anions of the metal salts have scarcely any effect on the removability of the metal ions from the solutions. The amounts of popcorn polymer having units of formulae I and/or II are chosen so that the number of mols of available carboxyl groups is at least equivalent to the number of metal ions in the solution. A molar excess of carboxyl groups is preferably used. For substantial complexing of the metal ions, from 2 to 100, preferably more than 50, mol % of the carboxyl functions of the popcorn polymers should be present in deprotonated form. In an advantageous procedure, the novel popcorn polymer having an appropriate amount of carboxyl functions is added to a metal salt solution. However, it is also possible to suspend such popcorn polymers as free acids in the metal salt solution and to increase the pH of the solution by adding bases, e.g. sodium hydroxide solution or ammonia, and thus to deprotonate the carboxyl functions. Marked complexing is observable in the case of $Cu^{2+}$ even at a pH above 5.

The complexing power of the carboxyl-carrying polymers is determined by quantitative analysis of the metal ions remaining in the solution. Suitable methods of analysis are, for example, complexometric titration and atomic absorption spectroscopy or spectralphotometry.

EXAMPLES

Example 1

Popcorn polymer 1

10 g of popcorn polymer having the molar composition of 87.7% of vinylamine×½ $H_2SO_4$ units, 4.6% of N-vinylformamide units, 6.6% of N-vinylpyrrolidone units and 1.1% of N,N'-divinylethyleneurea units (≘118 mmol of protonated vinylamine functions) are suspended in 300 g of water in a stirred apparatus having a reflex condenser and thermometer. 42.5 g of 97% strength sodium chloroacetate (≘354 mmol) are added and pH is brought to 10 with 49 g of 25% strength aqueous sodium hydroxide solution. The suspension is then heated at 80° C. for 10 hours with thorough stirring. After cooling to room temperature, the solid is filtered off with suction, washed several times with water and dried for 24 hours at 100° C. and 100 mbar in a vacuum drying oven. 17.8 g of carboxymethylated popcorn polymer having 73.7 mol % of units of the structure I ($R^1$, $R^2$, $R^3$=H, Me=Na) and 14.0 mol % of the structure II ($R^2$, $R^3$=H, Me=Na) are obtained.

Example 2

Popcorn polymer 2

10 g of a popcorn polymer having a molar composition of 73.4% of vinylamine×½ $H_2SO_4$ units, 8.1% of N-vinylformamide, 17.4% of N-vinylpyrrolidone units and 1.1% of N,N'-divinylethyleneurea units (≡93 mmol of protonated vinylamine functions) are reacted with 39 g of 97% strength sodium chloroacetate (≡325 mmol) and 45 g of 25% strength aqueous sodium hydroxide solution, as described in Example 1. 16.5 g of carboxymethylated popcorn polymer having 78.0 mol % of units of the formula I ($R^1$, $R^2$, $R^3$=H, Me=Na) and 22.0 mol % of units of the formula II where $R^2$ and $R^3$ are H and Me is Na are obtained.

Example 3

Popcorn polymer 3

10 g of a popcorn polymer having a molar composition of 56.0% of vinylamine×½ $H_2SO_4$ units, 4.2% of vinylformamide, 38.5% of N-vinylpyrrolidone units and 1.3% of N,N'-divinylethyleneurea units (≡64.1 mmol of protonated vinylamine functions) are reacted with 30.8 g of 97% strength sodium chloroacetate (≡256.4 mmol) and 24 g of 25% strength aqueous sodium hydroxide solution as described in Example 1. 14.4 g of carboxymethylated popcorn polymer having 44.8 mol % of units of the formula I where $R^1$, $R^2$, $R^3$ are H and Me is Na and 11.2 mol % of units of the formula II where $R^2$ and $R^3$ are H and Me is Na are obtained.

Example 4

Popcorn polymer 4

10 g of a popcorn polymer having a molar composition of 29.7% of vinylamine×½ $H_2SO_4$ units, 4.1% of N-vinylformamide, 64.8% of N-vinylpyrrolidone units and 1.4% of N,N'-divinylethyleneurea units (≡30.3 mmol of protonated vinylamine functions) are reacted with 14.7 g of 97% strength sodium chloroacetate (≡122 mmol) and 10 g of 25% strength aqueous sodium hydroxide solution as described in Example 1. 11.6 g of carboxymethylated popcorn polymer having 21.6 mol % of units of the formula I where $R^1$, $R^2$, $R^3$ are H and Me is Na and 8.1 mol % of units of the formula II where $R^2$ and $R^3$ are H and Me is Na are obtained.

Example 5

Popcorn polymer 5

25 g of popcorn polymer having the molar composition of 87.7% of 30 vinylamine, 4.6% of N-vinylformamide units, 6.6% of N-vinylpyrrolidone units and 1.1% of N,N'-divinylethyleneurea units (439 mmol of vinylamine functions) are suspended in 770 ml of water in a stirred apparatus equipped with a reflux condenser, two dropping funnels and a thermometer. First 26 g (95 mmol) of 99% strength hydrocyanic acid and then, in the course of 1 hour, 95 g (950 mmol) of a 30% strength formaldehyde solution are added dropwise at 20° C. The reaction mixture is stirred for 48 hours at 40° C. After filtration with suction, washing with water and drying, 55 g of a cyanomethylated product are obtained. This is taken up in 160 g of 10% strength aqueous NaOH and stirred for 36 hours at 95° C. while passing through nitrogen and from 800 to 900 mbar until no further ammonia escapes from the reaction mixture. After cooling to room temperature, the solid is filtered off, washed several times with water and dried for 24 hours at 100° C. and 100 mbar in a vacuum drying oven. 80 g of carboxymethylated popcorn polymer having 24 mol % of units of the formula I where $R^1$, $R^2$, $R^3$ is H and Me is Na and 66 mol % of units of the formula II where $R^2$, $R^3$ are H and Me is Na are obtained.

Use Examples

To investigate the complexing power, different amounts of the finely ground popcorn polymers 1 to 4 described above are added to 100 g of each of the stock solutions stated below, each of which contains 60 mg of the metal ion stated in the table. The suspension is stirred for 1 hour at room temperature, after which the metal ion content of the solution is determined by complexometric titration with Titriplex III solution. The results are shown in Table 1.

| Stock solutions: | | |
| --- | --- | --- |
| $CuSO_4$ | 1.5537 | g per l of aqueous solution |
| $NiSO_4 \cdot 6H_2O$ | 2.7952 | g per l of aqueous solution |
| $ZnSO_4 \cdot 7H_2O$ | 2.6694 | g per l of aqueous solution |
| $Hg(NO_3)_2 \cdot H_2O$ | 5.0179 | g per l of aqueous solution |
| $CaCl_2 \cdot 2H_2O$ | 2.2114 | g per l of aqueous solution |
| $MgCl_2 \cdot 6H_2O$ | 5.0179 | g per l of aqueous solution |

TABLE 1

Complexing power of the popcorn polymers 1 to 4

| | | Decrease in concentration [%] | | | |
| --- | --- | --- | --- | --- | --- |
| Metal ion | Polymer [g] | Popcorn polymer 1 | Popcorn polymer 2 | Popcorn polymer 3 | Popcorn polymer 4 |
| $Cu^{2+}$ | 0.1 | 38 | 33 | 26 | 18 |
| | 0.6 | 100 | 100 | 100 | 57 |
| | 2.0 | 100 | 100 | 100 | 100 |
| $Ni^{2+}$ | 0.1 | 28 | 30 | 17 | 9 |
| | 0.6 | 100 | 100 | 84 | 38 |
| | 2.0 | 100 | 100 | 100 | 96 |
| $Zn^{2+}$ | 0.1 | 30 | 33 | 20 | 9 |
| | 0.6 | 97 | 97 | 96 | 43 |
| | 2.0 | 98 | 98 | 96 | 97 |
| $Hg^{2+}$ | 0.1 | 85 | 91 | 60 | 34 |
| | 0.6 | 93 | 93 | 92 | 92 |
| | 2.0 | 94 | 94 | 94 | 93 |
| $Ca^{2+}$ | 0.1 | 19 | 18 | 14 | 6 |
| | 0.6 | 97 | 93 | 61 | 23 |
| | 2.0 | 99 | 98 | 98 | 67 |
| $Mg^{2+}$ | 0.1 | 14 | 13 | 9 | 6 |
| | 0.6 | 65 | 60 | 38 | 15 |
| | 2.0 | 98 | 98 | 98 | 43 |

We claim:

1. An insoluble, only slightly swellable, polymer having modified amino groups, which contains units of the formulae:

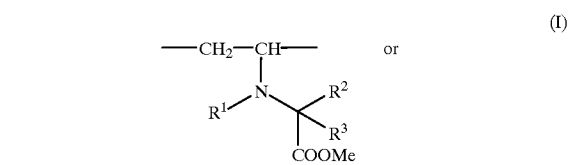

-continued

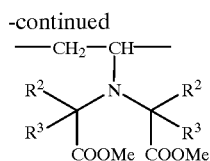
(II)

or both (I) and (II),
wherein:
$R^1$ is H or $C_1$–$C_6$-alkyl;
$R^2$, $R^3$ are each H, $C_1$–$C_{20}$-alkyl, aryl or aralkyl; and
Me is H or one equivalent of an alkali metal, of an alkaline earth metal or of ammonium.

2. The insoluble, only slightly swellable, polymer having modified amino groups of claim 1, wherein $R^1$, $R^2$ and $R^3$ are each H.

3. A process for the preparation of the insoluble, only slightly swellable, polymer having modified amino groups of claim 1, which comprises reacting an insoluble, only slightly swellable, polymer which contains units of the formula (III):

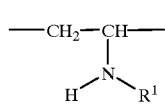
(III)

wherein $R^1$ is H or $C_1$–$C_6$-alkyl, with
(1) an α-halocarboxylic acid or an alkali metal, alkaline earth metal or ammonium salt thereof, or
(2) an aldehyde and hydrogen cyanide or an alkali metal cyanide, or
(3) a cyanohydrin obtained from an aldehyde and alkali metal cyanide; and hydrolysing the adduct formed.

4. The process of claim 3, wherein from 0.1 to 100% of the units of the formula (III) which are present in the polymer are converted.

5. The process of claim 3, wherein the reactions are carried out in aqueous suspension.

6. The process of claim 3, wherein the modification of the units of the formula:

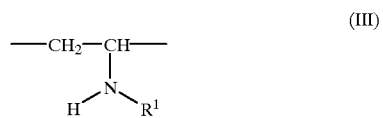
(III)

where $R^1$ is H or $C_1$–$C_6$-alkyl, with the formaldehyde and sodium cyanide is carried out in an aqueous medium.

7. An ion exchanger based on an insoluble, only slightly swellable, polymer having modified amino groups, which contains units of the formulae:

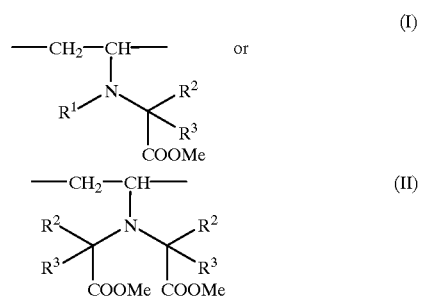

or both (I) and (II),
wherein:
$R^1$ is H or $C_1$–$C_6$-alkyl;
$R^2$, $R^3$ are each H, $C_1$–$C_{20}$-alkyl, aryl or aralkyl; and
Me is H or one equivalent of an alkali metal, of an alkaline earth metal or of ammonium.

* * * * *